2 Sheets--Sheet 1.

A. T. MORRIS.

Grapples for Dredgers.

No. 5,750. Reissued Feb. 3, 1874.

Witnesses:
E. V. Eliot
S. J. Gordon

Inventor:
Augustus T. Morris
By Boyd Eliot Atty

2 Sheets--Sheet 2.

A. T. MORRIS.

Grapples for Dredgers.

No. 5,750. Reissued Feb. 3, 1874.

Witnesses:
E. Eliot
S. J. Gordon

Inventor:
Augustus T. Morris
By Boyd Eliot atty

UNITED STATES PATENT OFFICE.

AUGUSTUS T. MORRIS, OF BLOOMFIELD, NEW JERSEY, ASSIGNOR TO HIMSELF AND JAMES CUMMINGS, OF NEW YORK CITY.

IMPROVEMENT IN GRAPPLES FOR DREDGERS.

Specification forming part of Letters Patent No. 85,602, dated January 5, 1869; reissue No. 5,750, dated February 3, 1874; application filed July 14, 1871.

*To all whom it may concern:*

Be it known that I, AUGUSTUS T. MORRIS, of Bloomfield, in the county of Essex and State of New Jersey, have invented certain Improvements in Excavators, of which the following is a specification:

This invention is intended for grappling and lifting bowlders and rocks lying under water, for pulling up piles and crib-work, for tearing to pieces sunken vessels, and removing obstructions to navigable waters.

Said apparatus may also be employed for grappling and raising articles on land or shipboard, and then dropping said articles or becoming disconnected from them with facility.

In Letters Patent granted to me, May 8, 1866, an apparatus is shown for excavating earth, mud, or other light or loose materials in a scoop formed of segmental buckets; but in my present invention, a pair of open-work claws, of a peculiar construction, is applied in place of the segmental buckets, and actuated by mechanism corresponding generally to that shown therein, so that the claws can be opened as required, or closed by a very powerful mechanism, so as to grapple and firmly hold any article the machine is capable of grasping, or pull to pieces and cut up any vessel, piles, or other submarine obstructions of wood, by a series of blows in closing the grapple, or by pulling thereon by competent power.

Figure 1:
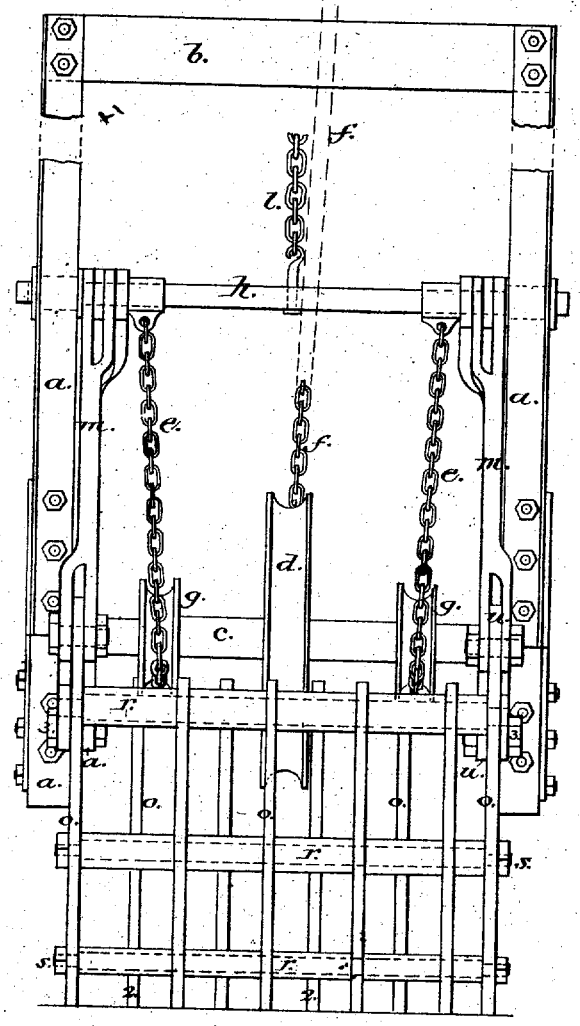
Figure 2:
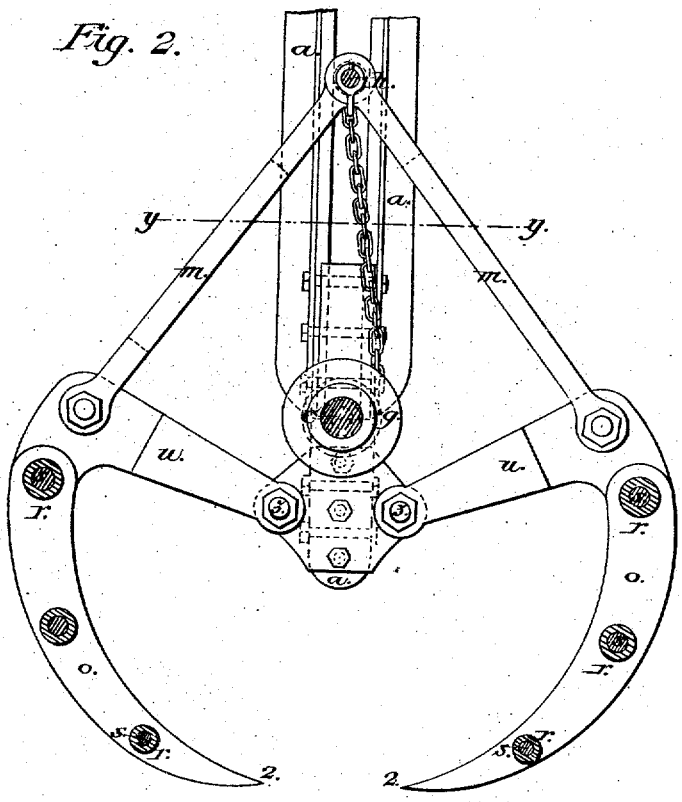
Figure 3:
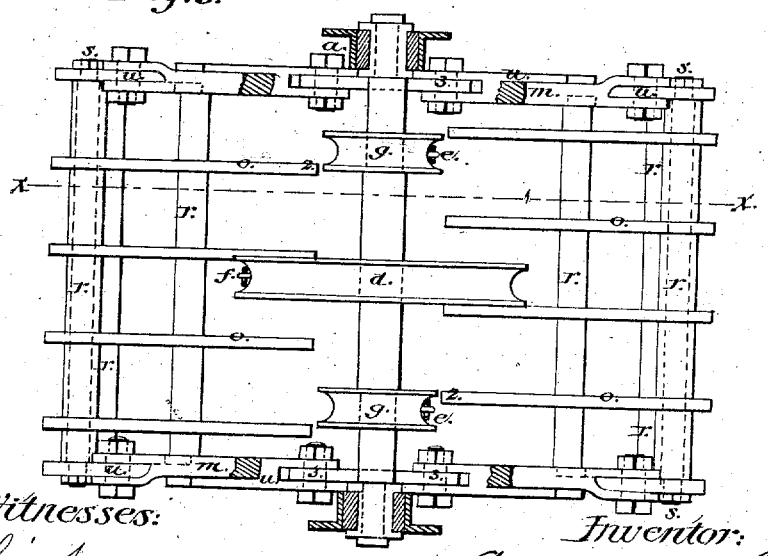

Figure 1 is a view, in elevation, of said grappling apparatus. Fig. 2 is a vertical section of the same at the line *x x*, Fig. 3, and represents the claws partially open. Fig. 3 is a sectional plan at the line *y y* of Fig. 2.

The principal frame for carrying said grapple consists of two side pieces, *a a*, of any convenient dimensions joined together at or near their upper end by a cross-head, *b*, and they are partially held from spreading at the bottom by the collars on the shaft *c*, which extends across and between the side pieces *a a*, and is mounted in suitable boxes or bearings firmly attached to said side pieces near their lower end. Upon this shaft is a drum or grooved pulley, *d*, for the hoisting-chain *f*, and also smaller drums, *g g*, with chains *e e* reaching therefrom to the sliding cross rod or bar *h*, the ends of which rod or bar work in long slots in the side pieces *a a*, so as to permit said cross-rod to be moved bodily up or down when operated upon by the chains *e e* or the discharging-chain *l*, which is also attached to said sliding rod *h*. From said rod *h* toggle-bars, as at *m*, extend to the grapple.

The grapple-claw itself is made of a series of tapering and curved plates, (best seen at *o*, Fig. 2,) set on edge relatively to the ground, and terminating at the lower end, if desired, with steel cutting-points 2 2. Said plates are held relatively to each other in a vertical position by rods or bolts *s* passing through them, said rods having thimbles or sleeves *r* around them and between the plates to hold the plates the proper distances apart, and to serve as studs to brace them firmly in an upright position relatively to each other. The extreme outer pairs of said plates are made longer than the inner ones to serve for arms, as at *u*, to attach the grapple to the side pieces or frame *a a*, where they are attached by pivots, as shown at 3 3 in the drawings.

It will now be readily understood that by the chain *l* the rod *h* may be drawn up and the grapple held open while being lowered over any article to be moved, the points of the claws thereby descending in the best possible position to penetrate the surrounding material, and when the chain *f* is drawn upon, it operates through the drums *d* and *g* and toggles *m* to close the grapple with a powerful concussion and gripe, at the same time permitting the water and mud or sand, &c., to escape from between the plates freely or without causing any substantial resistance to the proper grappling action of the claws.

When this apparatus is applied to stones or similar hard substances, the claws grasp around the same, or if only upon the opposites sides, may be forced by a series of blows caused by pulling first on one chain and then on the other until the points of the claws penetrate said substances sufficiently to gripe the same for removing it.

For wood and other soft substances the chisel ends of the claws will readily penetrate to such a depth that a firm hold can be obtained for tearing to pieces or pulling up any articles that may be grasped, as the piles or timbers of crib-work, or the same may be severed by the chopping or cutting action of the claws.

By making such grapples of open-work, another very important advantage beyond that of permitting the claws to descend easily into the mud and sand is gained, viz., that of draining off the water from materials to be lifted before the load is dropped onto the bank or scow.

In the hoisting of coal or ores from wrecks this is of great importance, and produces a great saving both in labor and expense.

What I claim, therefore, and desire to secure by Letters Patent, is—

The grapple formed of the bars *o*, united together and provided with the arms *u*, that are jointed to the frame *a*, in combination with the toggle-bars *m*, bar *h*, pulleys *d* and *g g*, and actuating chains *l f e*, substantially as set forth.

A. T. MORRIS.
JAMES CUMMINGS.

Witnesses:
W. C. WITTER,
BOYD ELIOT.